May 19, 1959
G. V. YOUNG
2,887,591
INTEGRAL TRANSDUCER AMPLIFIER SYSTEM
Filed July 8, 1957
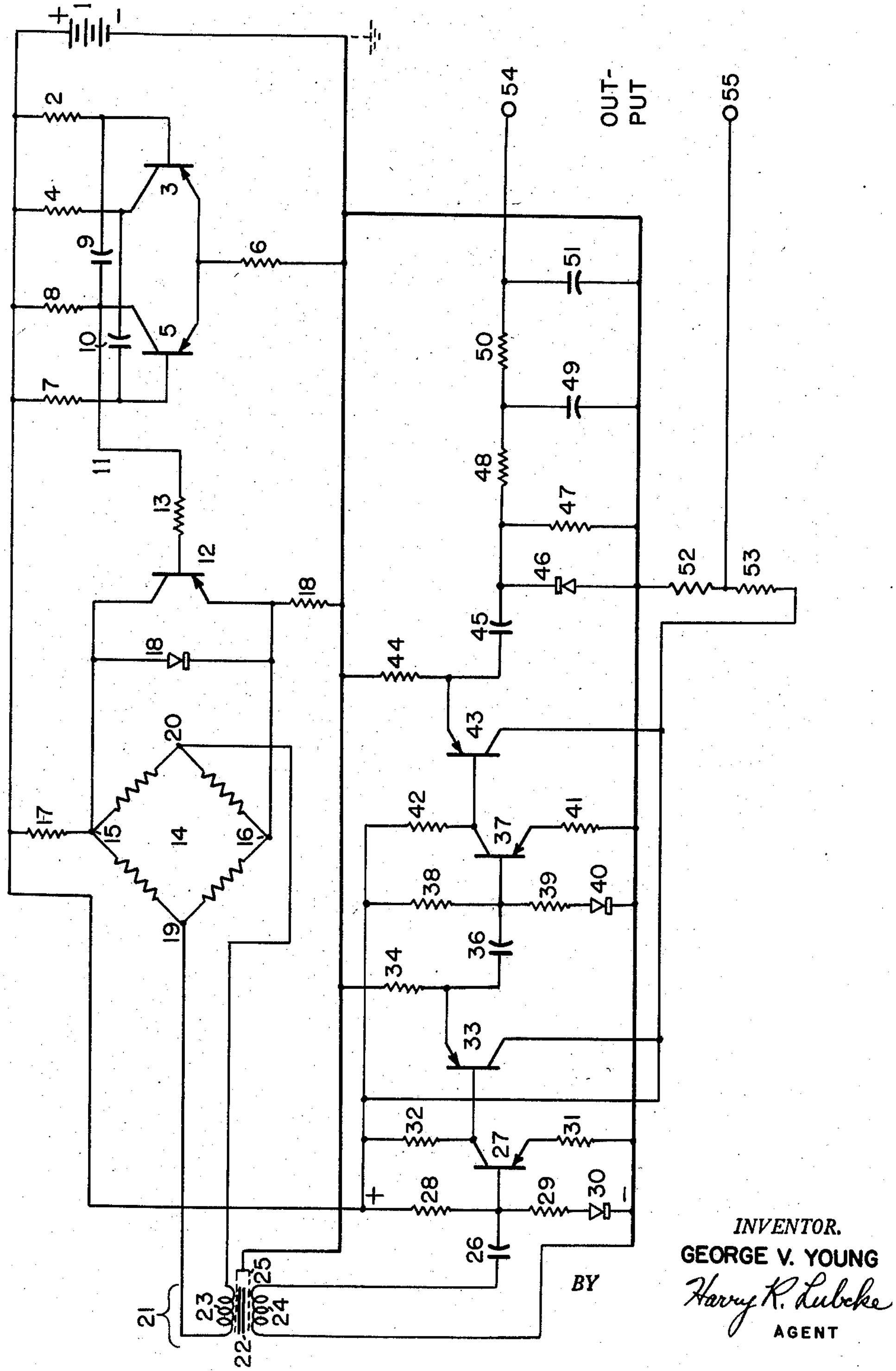
INVENTOR.
GEORGE V. YOUNG
BY *Harry R. Lubcke*
AGENT 2,887,591

INTEGRAL TRANSDUCER AMPLIFIER SYSTEM

George V. Young, Los Angeles, Calif., assignor to Video Instruments Co., Inc., Santa Monica, Calif., a corporation of California Application July 8, 1957, Serial No. 670,562

7 Claims. (Cl. 307—88.5)

My invention relates to an electrical circuit for providing an amplified output from a transducer or the like and more particularly to an all-transistor system for providing such amplification in close proximity to said transducer.

In various fields including those of aeronautics and missiles transducers are frequently used for tests or for full time indication of strains, pressures and other parameters. The outputs of such mechanical to electrical devices are of the order of 20 millivolts maximum. For an indicating or telemetering observation of the output this voltage must be amplified to the order of 5 volts. The outputs of transducers often vary quite slowly and the static value measured is usually of interest. Consequently, so-called direct current amplification is required.

While direct current amplifiers are known they invariably drift in zero level and perhaps in amplifying characteristics with temperature and for variations in the electrical energy supply or because of ageing of the electrical components.

Another system alters the input signal itself by a chopper, that is, the output signal of the transducer, so that this essentially direct current signal is interrupted into a series of alternating current signals having amplitudes proportional to the original direct current signal. The alternating current signal may then be amplified by the more stable alternating current amplifier, with improvement in operating and maintenance characteristics.

In such a system it has been usual to provide an alternating carrier signal from a central observing source to each transducer and to subsequently return the output of each to the same observing point for amplification. Such systems have the disadvantage that difference in temperature of the to and from wiring due to sunshine, snow, etc. adds a spurious variable that may mask the transduced signal.

In missile work, of course, such a spread-out arrangement is impossible. In any transducer application a small amplifying system closely disposed with respect to the transducer element that adds little in size and weight and gives a system output of several volts for a small D.C. power supply input is something the art has long sought.

Briefly, I am able to fulfill this need in a novel manner by providing a transistor multivibrator operating to produce a square wave at a high audio frequency, a keyer transistor and a Zener diode for supplying a constant amplitude of this square wave directly to the electrical bridge of the transducer. This arrangement is much less susceptible to drift than if the output signal from the transducer is subsequently chopped at low level. By employing a small and high quality transformer connected across the opposite diagonal of the bridge I am able to obtain only the differential signal arising because of the functioning of the transducer bridge and eliminate the common input square wave signal from both bridge arms.

This signal is impressed upon a two stage transistor amplifier in which each stage has a transistor for amplification and another one direct-connected to the first to reduce the circuit impedance thereof to a value suited for matching the input impedance of the amplifying transsistor of the following stage. Diodes are included in the base circuit of each amplifying transistor that are of the same semiconductor material as that of the transistor, for example, silicon, so that the emitter voltage will be stabilized with respect to temperature over a wide range. By means of a peak voltage diode rectifier and a low pass resistance-capacitance filter I restore a direct current output that varies proportionally according to the original transducer signal.

By providing a further element in the form of a temperature sensitive resistor in an auxiliary output circuit and by taking the desired output from the low pass filter and the auxiliary circuit as the two output terminals I obtain a temperature stabilized output over a range of, for instance, −55° F. to +287° F.

Because the various elements of my amplifying system are small and require only small amounts of power at low voltage the system is only slightly larger than the transducer itself. The two may be physically combined in a metal cylinder the same diameter as, and only twice as long as, the transducer unit. It is apparent that I have eliminated drifts due to the effects of ambient conditions on long leads and have provided an amplified transducer device which may be positioned in almost all places where a transducer alone can be accommodated.

An object of my invention is to provide a transducer entity having a stabilized amplifying system integrally related thereto.

Another object is to provide an all-transistor transducing system.

Another object is to provide an electrical-chopper signal-takeoff combination for a bridge transducer which is inherently free of drift.

Another object is to provide a stabilized transistor amplifier adapted to coact with the above said combination.

Another object is to provide an auxiliary output circuit adapted to further correct electrical drift occasioned by the variation of semiconductor characteristics with temperature.

Other objects of my invention will become apparent upon reading the following detailed specification and upon examining the accompanying drawing, in which:

The single figure shows a complete schematic diagram of my system.

In the figure the upper right portion of the circuit comprises a transistor multivibrator or relaxation oscillator of simple type according to my invention. Battery 1 represents the basic source of power for operating the system and may be of the order of 28 volts. Resistor 2 has the fairly high value of the order of 100,000 ohms and connects from the positive terminal of battery 1 to the base of transistor 3. The collector of transistor 3 connects to the positive terminal of the battery through low-valued resistor 4, having a resistance of the order of 2,000 ohms. The emitter of transistor 3 is connected to the emitter of a symmetrically connected transistor 5 and through a common resistor 6 of the order of 500 ohms to the negative terminal of battery 1.

Symmetrically with respect to the connections of transistor 3, the base of transistor 5 is connected to the positive terminal of the battery through resistor 7 of the same resistance value as resistor 2, and the collector is similarly connected through resistor 8 of the same value as resistor 4. The base of transistor 3 is cross-connected to the collector of transistor 5 through a small capacitor 9, having a capacitance of the order of 0.005 microfarad, and the base of transistor 5 is similarly cross-connected to the collector of transistor 3 by capacitor 10 of the same value.

The multivibrator above described operates at a frequency of the order of 10,000 cycles and gives a square waveform output of the order of 20 volts peak to peak. This output is conveniently taken from the collector of transistor 5 via conductor 11, which output is a square waveform having excursions between plus 4 and plus 24 volts for 28 volt supply battery 1.

Transistor 12 is the keyer element. This coacts with the transducer in that it meters the output of the multivibrator such that the transducer is shorted at one excursion of the square wave and allowed to assume an output proportional to the energy transduced during the other excursion.

Resistor 13 has a resistance of several thousand ohms and is connected between the base of transistor 12 and conductor 11. It is through this resistor that the square wave is impressed upon transistor 12. The transducer with which my system is particularly adapted to coact has a balanced electrical circuit of which Wheatstone bridge 14 is typical. The emitter and collector of transistor 12 are connected across one diagonal of the bridge, at points 15, 16. These points are also connected to the positive and negative terminals of battery 1 through equal resistors 17, 18, having a resistance of the order of 500 ohms each. These resistors also act as the external impedances for the emitter and collector of the keyer transistor. It will also be noted that these resistors set the potential of the bridge 14 as a whole at approximately the mid-voltage of battery 1. A Zener (breakdown) diode 18 is also connected across bridge points 15 and 16. This acts as a voltage limiter, causing the excursions of the square wave voltage to have a uniform amplitude regardless of variations in output of the multivibrator or keyer.

The recited portion of the circuit acts in the following manner. When the square wave amplitude impressed upon the keyer is plus 4 volts that transistor is reverse-biased and does not conduct. Consequently, the bridge 14 assumes potentials corresponding to the transducer environment imposed upon it. When the square wave amplitude is plus 24 volts the transistor does conduct and the bridge is shorted across terminals 15 and 16. The amplitude of square wave impressed upon the bridge terminals 15 and 16 is constant and of the order of 5 volts peak to peak.

Bridge terminals 19 and 20, the other diagonal, is connected to toroidal transformer 21. This translative means is small, having an overall diameter of one inch, a moly-Permalloy tape core 22, primary 23 of 50 millihenries inductance, secondary 24 of the same inductance, and a grounded Faraday shield 25 between the core and both windings. Preferably, one winding is one place on the circumference of the core and the other winding opposite thereto on the core to reduce capacitative coupling to a minimum. The turns ratio of the transformer described is, of course, one to one.

As well known from transformer theory, transformer 21 does not pass the "direct current" potentials involved at bridge 14 but only the variations in amplitude of the square wave impressed upon the bridge; i.e., only the bridge unbalance. The transformer couples only to the amplifier the difference in square wave potential between points 19 and 20. It does not couple the large common mode signal that exists at both points 19 and 20 with respect to ground.

The desired signal from secondary 24 is impressed upon the first stage of the transistor amplifier through coupling capacitor 26. The latter is of low reactance at the operating frequency, having a capacitance of the order of 0.1 microfarad. The base of transistor 27 is biased by resistors 28 and 29 from battery source 1. Resistor 29 has a resistance of the order of 1,000 ohms and resistor 28 twenty-five times that amount.

Preferably silicon diode 30 is in series with resistor 29 adjacent to signal ground for temperature compensation purposes. There is a large energy gap in silicon semiconductors, both transistors and diodes. The variation of this parameter with temperature is considerable. I use the diode-transistor combination to give uniform amplifier operation over a wide temperature range, as from −55° F. to +287° F. At room temperature, for instance, the gap is equivalent to 0.7 volt, while at +287° F. it is only 0.2 volt. In transistor 27 the voltage between base and emitter is a function of the energy gap. The above-noted variation in voltage of a half volt would appear across this junction and alter the operating currents far too much for temperature-independent operation. However, in my arrangement described the same voltage variation appears across diode 30 and so the bias current from base to emitter remains constant regardless of temperature.

The emitter of transistor 27 is connected to the negative end of battery 1 through resistor 31 having a resistance of the order of 500 ohms, while the collector is connected to the positive end through resistor 32 having a resistance of the order of 10,000 ohms.

I prefer to accomplish a desirable impedance matching in this transistor amplifier by direct coupling the base of a second transistor 33 to the collector of the first. The collector of the second transistor is direct connected to the positive terminal of battery 1 and the emitter is connected to the negative terminal through resistor 34 having a resistance of the order of 15,000 ohms. This arrangement provides an output impedance of the transistor pair of the order of 500 ohms and very satisfactorily matches the input impedance of the following transistor.

The repeating group of elements, starting with coupling capacitor 36 and ending with second transistor 43, have the same characteristics, connection and function as corresponding elements 26 to 33 previously described. The second group comprise the second stage of the two stage transistor amplifier.

Resistor 44 connects the emitter of transistor 43 to the negative terminal of battery 1, as before, but because of greater current flow has a resistance of only 3,000 ohms. Coupling capacitor 45 connects the said emitter to silicon diode 46; the former having a capacitance as previously specified for coupling capacitors and the latter, also connected to the negative terminal of battery 1 (signal ground) acting as a peak value rectifier. The diode is shunted by a resistor 47 having a resistance of the order of 50,000 ohms.

A low pass resistance-capacitance filter follows, composed of series resistor 48 of 5,000 ohms resistance, shunt capacitor 49 of 0.1 microfarad capacitance, series resistor 50 of 2,000 ohms resistance and second shunt capacitor 51 of 0.1 microfarad capacitance. This filter is for the purpose of removing residual 10,000 cycle square wave components, providing instead a varying value of direct current corresponding to the variations originally impressed upon the transducer. The time constant of the filter is $10^{-3}$ seconds, allowng the output to vary as rapidly as 500 cycles per second.

I prefer to arrange the values of the circuits associated with diode 46 as has been described to give a direct current potential of the order of a half volt positive for no input to the transducer. I then provide an auxiliary circuit comprised of resistors 52 and 53 connected between the positive and negative terminals of battery 1 that compensates for the temperature variation of the performance of diode 46. Resistor 52 is a temperature sensitive resistor of the wire wound type having a positive temperature coefficient of resistivity of approximately 0.004 part/° C. The resistance is of the order of 2,000 ohms. Resistor 53 is an ordinary resistor preferably having a zero temperature coefficient and has a resistance of 100,000 ohms. The combination of the two resistors gives a voltage at the junction thereof of a half volt positive at ordinary temperature. At high temperatures this voltage increases, as does the voltage at diode 46, so that the net potential difference between these two points remains zero insofar as temperature variation is concerned. Consequently, between output terminal 54 connected to the output of the low pass filter and output terminal 55 connected to the junction of resistors 52 and 53 an output independent of temperature is obtained. This output normally varies from zero to plus 5 volts depending upon the energy imposed upon the transducer. The maximum value stated corresponds to an output from the transducer proper of the order of 20 millivolts.

In a practical embodiment of my system all the transistors described are of the NPN type silicon, such as the Texas Instrument Co. 2N118, and the diodes are also of silicon semiconductor, such as the Hughes 6005.

All the elements of the system, save the transducer and battery, may be contained within a rectangular parallelepiped volume approximately 2¾" x 1⅝" x 1⅛". Variable controls or adjustments are not required.

My system is coactive with any transducer or other device having a Wheatstone bride or equivalent balanced electrical element. One such well known transducer is the strain gauge, in which two arms of the bridge are electrically unbalanced by the physical elongation of the fine resistance wires thereof by the strain imposed. Other equivalent transducers measure pressure, acceleration, or loads (as in weighing).

Certain modifications of my system are possible.

The multivibrator may be composed to operate at another frequency than the 10,000 cycles previously stated. In general, the frequency should be within the range of 1,000 to 100,000 cycles.

Rather than the NPN transistors described, transistors of the PNP type may be employed. For this alternate embodiment the polarities of battery 1 and Zener diode 18 are reversed.

Battery 1 may be replaced by an A.C. to D.C. rectifier-filter power supply of the same voltage capability. This supply should be regulated for accurate work but need not be regulated for nominal work. By altering the many resistance values in the system appropriately upward so that the transistor biases remain substantially the same the voltage of battery 1 may be increased, and vice versa.

Where the temperature limits of operation need not be as widely separated as possible with silicon semiconductors, germanium diodes and transistors may be employed instead.

In certain applications the residual varying square wave output of the amplifier may be used directly. In this instance the elements from diode 46 to terminal 55 can be eliminated. Where the temperature variation is not extreme the output balancing elements 52, 53 and 55 can be eliminated. As shown in the figure, however, the system represents a highly desirable package that supplies a varying D.C. output of the order of volts rather than millivolts. Nothing additional in the way of supply electrical energy voltages or controls are required and only little additional space and weight than for the transducer proper.

Other nominal modifications may be made in the characteristics of the circuit elements, details of circuit connections, alteration of the coactive relation between the elements, and in the arrangement, size, proportions and shape of my system without departing from the scope of my invention.

Having thus fully described my invention and the manner in which it is to be practiced, I claim:

1. A transducer system comprising a resistor bridge transducer, electrical means, keying means, and limiting means, said keying means directly connected to said electrical means to suppress alternate half cycles thereof, said keying means and said limiting means directly connected to said transducer to supply electrical energy thereto of constant amplitude large with respect to alteration of said energy by transducer action, purely inductive means connected to said bridge transducer in opposite relation to said keying means to pass only said alterations of said electrical energy, plural pairs of cascade direct connected amplifier transistors, each said pair having a semiconductor diode direct connected for temperature compensation, rectifier means, the first of said pairs connected to said further means and the last of said pairs connected to said rectifier means, still further means connected to said rectifier means to modify said alterations of said electrical energy to a varying current form.

2. A transducer system comprising a balanced resistive bridge transducer, alternating electrical means, keying means, and limiting means, said keying means connected to said alternating electrical means to suppress alternate half cycles thereof, said keying means and said limiting means connected to said transducer to supply actuating electrical energy thereto of unaltering amplitude large with respect to alteration of said energy by transducer action, isolating transformer means connected to said balanced transducer in balanced relation to said keying means to pass only said alterations of said electrical energy, at least one direct-connected transistor amplifier pair having a semiconductor diode also direct connected thereto for temperature compensation, rectifier means, said pair connected in cascade to said isolating transformer means and to said rectifier means, filter means connected to said rectifier means to provide a varying direct current form to said alterations of said electrical energy; said several means disposed closely adjacent to said transducer to effect the over-all spatial equivalent of a transducer of very high output.

3. A unitary transducer system comprising a balanced bridge transducer, electrical oscillatory means, keying means, and limiting means, said keying means direct connected to said oscillatory means to suppress alternate half cycles thereof, said keying means and said limiting means direct connected to said transducer to supply actuating electrical energy thereto of limited amplitude large with respect to alteration of said energy by transducer action, inductor means having low stray capacitance connected to said balanced transducer in balance relation to said keying means to pass only said alterations of said electrical energy, plural cascade direct-connected transistor amplifier pairs, rectifier means, the first of said pairs connected to said inductor means, the last of said pairs connected to said rectifier means, filter means, said filter means connected to said rectifier means to provide an envelope form to said alterations of said electrical energy; said several means being of small size and closely disposed about said transducer to constitute in physical structure the equivalent of a transducer of high inherent output.

4. A transistorized electrical transducer bridge system comprising transistor means for forming an electrical energy wave of rectilinear shape, a transistor connected to said transistor means and to one diagonal of said bridge to short said bridge upon one excursion of said wave of rectilinear shape and to impose no load upon said bridge upon the opposite excursion, a Zener diode also connected across said one diagonal to limit the amplitude of said wave of rectilinear shape, a low capacitance transformer connected across the opposite diagonal of said bridge, a transistor amplifier, said transformer also connected to said amplifier to convey thereto only the variation in amplitude of electrical energy of said wave of rectilinear shape occasioned by a variation of an electrical parameter of said bridge, means connected to said amplifier to remove all components of said wave of rectilinear shape from the electrical output of said amplifier, and transistor-like means of the same semiconductor material as the transistors of said transistor amplifier forming a part of said amplifier to provide an electrical output therefrom corresponding to said electrical parameter of said bridge independent of ambient temperature.

5. A transistorized Wheatstone bridge transducer system comprising transistor means for forming an alternating electrical energy waveform of square shape, a transistor connected to said transistor means and to one diagonal of said bridge poled to short said bridge upon one excursion of said waveform of square shape and to act as an open-circuit on said bridge upon the opposite excursion, a diode also connected across said one diagonal to limit the amplitude of said waveform of square shape, a low-stray-capacitance transformer connected across the opposite diagonal of said bridge, a transistor amplifier having triple semiconductor means per stage, said amplifier connected to said transformer to amplify only the variation in amplitude of electrical energy of said waveform of square shape occasioned by a variation of an electrical parameter of said bridge, means connected to said amplifier to remove all components of said waveform of square shape from the electrical output of said amplifier, and said triple semiconductor forming a part of said amplifier and temperature-sensitive impedance means a part of the output circuit of said system to provide an electrical output therefrom corresponding to an electrical parameter of said bridge independent of ambient temperature.

6. A temperature-compensated transducer system comprising a resistive bridge type transducer, a transistor multivibrator, a transistor keyer, and a limiting diode, said multivibrator connected to said keyer, said keyer connected across a diagonal of the bridge of said transducer, and said diode connected across said keyer and said diagonal to limit the output from said multivibrator to a fixed amplitude as applied to said bridge; a transformer having an electrostatic shield between the primary and the secondary thereof, said primary connected to the diagonal of said bridge opposite to that to which said keyer is connected, said secondary connected to a transistor amplifier, each stage of said amplifier having a diode for emitter current stabilization with temperature and a common emitter connected transistor with a common collector transistor direct connected thereto, the latter to reduce the impedance of the output of said stage, a peak rectifier connected to the output of said amplifier, a low pass filter connected to said rectifier to remove the multivibrator alternations from the output of said system, a temperature sensitive auxiliary circuit connected to a voltage source such that an output taken from said filter and from said circuit is proportional to the output of said transducer independent of alteration of the voltage outputs of said transistors, diode and rectifier with temperature.

7. A temperature-compensated transducer amplifying system comprising a transducer of the resistance bridge type, a square wave transistor multivibrator, a transistor keyer, and a Zener diode, said multivibrator connected to said keyer, said keyer connected to a diagonal of the bridge of said transducer, and said Zener diode connected across said keyer and said bridge to limit the square wave from said multivibrator to a fixed amplitude as applied to said bridge; a toroidal unity-ratio transformer having electrostatic shields between the primary and the secondary thereof, said primary connected to the diagonal of said bridge opposite to that to which said keyer is connected, said secondary connected to a two stage transistor amplifier, each stage of said amplifier having a diode for emitter current stabilization with temperature, a common emitter connected transistor and a common collector transistor direct connected thereto, the latter to reduce the impedance of the output of the stage, a peak voltage diode rectifier connected to the second stage of said amplifier, a low pass resistance-capacitance filter connected to said rectifier to remove the square wave alternations from the output of said system, an auxiliary output circuit having a temperature sensitive resistor, said resistor connected to a voltage source such that with an output taken from said filter for one terminal and from one end of said temperature sensitive resistor for the other terminal the voltage output obtained is proportional to the output of said transducer and independent of the effect of temperature upon said transistors and diodes.

References Cited in the file of this patent

UNITED STATES PATENTS

| | | |
|---|---|---|
| 2,509,621 | Willoughby | May 30, 1950 |
| 2,714,702 | Shockley | Aug. 2, 1955 |
| 2,774,021 | Ehret | Dec. 11, 1956 |
| 2,823,312 | Keonjian | Feb. 11, 1958 |
| 2,864,978 | Frank | Dec. 16, 1958 |

FOREIGN PATENTS

| | | |
|---|---|---|
| 709,036 | Great Britain | May 12, 1954 |

OTHER REFERENCES

Article entitled "Practical Two-Stage Transistor Amplifiers," by Riddle, Electronics, April 1954, pp. 169–171.